US008688267B2

(12) United States Patent
Blaine et al.

(10) Patent No.: US 8,688,267 B2
(45) Date of Patent: Apr. 1, 2014

(54) CLASSIFYING WORKPIECES TO BE PORTIONED INTO VARIOUS END PRODUCTS TO OPTIMALLY MEET OVERALL PRODUCTION GOALS

(75) Inventors: George Blaine, Lake Stevens, WA (US); John R. Strong, Bellevue, WA (US); Arthur W. Vogeley, Jr., Seattle, WA (US); Craig E. Pfarr, Issaquah, WA (US)

(73) Assignee: John Bean Technologies Corporation, Chicago, IL (US)

( * ) Notice: Subject to any disclaimer, the term of this patent is extended or adjusted under 35 U.S.C. 154(b) by 268 days.

(21) Appl. No.: 12/684,628

(22) Filed: Jan. 8, 2010

(65) Prior Publication Data

US 2010/0179684 A1 Jul. 15, 2010

Related U.S. Application Data

(63) Continuation-in-part of application No. 11/321,755, filed on Dec. 28, 2005, now Pat. No. 7,672,752.

(60) Provisional application No. 60/640,282, filed on Dec. 30, 2004.

(51) Int. Cl.
*G06F 7/00* (2006.01)

(52) U.S. Cl.
USPC ............. 700/230; 700/97; 700/100; 700/117; 702/19; 702/22; 356/606; 434/109; 452/157

(58) Field of Classification Search
USPC .......................................................... 700/223
See application file for complete search history.

(56) References Cited

U.S. PATENT DOCUMENTS

| | | | | |
|---|---|---|---|---|
| 4,541,722 | A * | 9/1985 | Jenks | 356/606 |
| 4,875,254 | A | 10/1989 | Rudy | |
| 4,962,568 | A | 10/1990 | Rudy | |
| 5,019,716 | A | 5/1991 | Meier | |
| 5,585,603 | A | 12/1996 | Vogeley, Jr. | |
| 5,732,939 | A | 3/1998 | Meier | |
| 5,868,056 | A | 2/1999 | Pfarr | |
| 6,101,423 | A * | 8/2000 | Csipkes et al. | 700/117 |
| 6,186,059 | B1 * | 2/2001 | Mello et al. | 100/35 |

(Continued)

FOREIGN PATENT DOCUMENTS

JP 08006605 A2 1/1996

*Primary Examiner* — Gene Crawford
*Assistant Examiner* — Kyle Logan
(74) *Attorney, Agent, or Firm* — Christensen O'Connor Johnson Kindness PLLC

(57) ABSTRACT

A method is provided for classifying incoming products (e.g., chicken butterflies) to be portioned into two or more types of end products (e.g., sandwich portions, strips, nuggets, etc.) to meet production goals. The method includes generally five steps. First, information on incoming products is received. Second, for each incoming product, a parameter value (e.g., the weight of an end product to be produced from the incoming product) is calculated for each of the two or more types of end products that may be produced from the incoming product. Third, the calculated parameter values for the incoming products for the two or more types of end products, respectively, are normalized so as to meet the production goals while at the same time achieving optimum parameter values. Fourth, for each incoming product, the end product with the best (e.g., largest) normalized parameter value is selected as the end product to be produced from the incoming product. Fifth, each incoming product is portioned to produce the end product selected in the fourth step.

20 Claims, 9 Drawing Sheets

(56) References Cited

U.S. PATENT DOCUMENTS

| | | | | |
|---|---|---|---|---|
| 6,377,864 | B1 | 4/2002 | Lindstrom | |
| 6,738,686 | B2 | 5/2004 | Caretta | |
| 6,951,274 | B2 | 10/2005 | Zeitler | |
| 7,043,320 | B1 * | 5/2006 | Roumeliotis et al. | 700/100 |
| 7,153,203 | B2 | 12/2006 | Pfarr | |
| 2003/0065414 | A1 * | 4/2003 | van den Nieuwelaar et al. | 700/97 |

* cited by examiner

CLASSIFYING WORKPIECES TO BE PORTIONED INTO VARIOUS END PRODUCTS TO OPTIMALLY MEET OVERALL PRODUCTION GOALS

CROSS-REFERENCES TO RELATED APPLICATIONS

This application is a continuation-in-part of application Ser. No. 11/321,755, filed Dec. 28, 2005, which claims the benefit of Provisional Application No. 60/640,282, filed Dec. 30, 2004, the disclosures of which are incorporated by reference herein.

TECHNICAL FIELD

The present application relates generally to processing workpieces, such as food products, and more specifically to classifying workpieces to be portioned into two or more types of end products in light of overall production goals.

BACKGROUND

Workpieces, including food products, are portioned or otherwise cut into smaller pieces by processors in accordance with customer needs. Also, excess fat, bone, and other foreign or undesired materials are routinely trimmed from food products. It is usually highly desirable to portion and/or trim the workpieces into uniform sizes, for example, for steaks to be served at restaurants or chicken fillets used in frozen dinners or in chicken burgers. Much of the portioning/trimming of workpieces, in particular food products, is now carried out with the use of high-speed portioning machines. These machines use various scanning techniques to ascertain the size and shape of the food product as it is being advanced on a moving conveyor. This information is analyzed with the aid of a computer to determine how to most efficiently portion the food product into smaller pieces of optimum sizes.

Portioning machines of the foregoing type are known in the art. Such portioning machines, or portions thereof, are disclosed in prior patents, for example, U.S. Pat. Nos. 4,962,568 and 5,868,056, which are incorporated by reference herein. Typically, the workpieces are first carried by an infeed conveyor past a scanning station, whereat the workpieces are scanned to ascertain selected physical characteristics, for example, their size and shape, and then to determine their weight, typically by utilizing an assumed density for the workpieces. In addition, it is possible to locate discontinuities (including voids), foreign material, and undesirable material in the workpiece, for example, bones or fat in a meat portion. The data and information measured/gathered by the scanning devices are transmitted to a computer, typically on board the portioning apparatus, which records the location of the workpiece on the conveyor as well as the shape and other characteristics of the workpiece. With this information, the computer determines how to optimally cut or portion the workpiece at the portioning station, and the portioning may be carried out by various types of cutting/portioning devices.

It is desirable to classify randomly sized incoming products (e.g., chicken breast butterflies) into multiple groups for producing different types of end products (e.g., sandwich portions, chicken strips, chicken nuggets, etc.), respectively, such that each of the classified incoming products is optimally suited for producing the particular end product. For example, certain incoming products may be better suited for producing type A end products, while other incoming products may be better suited for producing type B end products.

These incoming products should be classified into two groups for producing type A end products and type B end products, respectively.

Current methods of classifying workpieces into multiple groups for producing different types of end products are based on rather simple rules of thumb. An example of a rule of thumb is that some end products are best produced from heavier incoming products, while other end products are best produced from lighter incoming products. In this example, incoming products are weighed and classified to multiple groups based solely on their weight. Naturally, these classification methods are not as accurate as desired. Furthermore, these classification methods do not consider the overall production goals to be met. Specifically, for each portioning process, a user typically sets certain production goals that need to be met. The production goals may entail, for example, specific quantities of various end products to be produced at the end of the portioning process. If classification is carried out based on the weight-based rule of thumb, for example, and if there are approximately equal numbers of heavier incoming products and lighter incoming products, then the classification may produce approximately equal quantities of the end products that are best produced from heavier incoming products (e.g., type A end products) and the end products that are best produced from lighter incoming products (e.g., type B end products). The production goals, however, may actually require that more or less type A end products be produced than type B end products. Then, at the end of the portioning process, the production goals are not met.

A need exists for a method and system for classifying incoming products to produce various types of end products while at the same time meeting overall production goals.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present invention, a method is provided for classifying incoming products (e.g., chicken butterflies) to be portioned into two or more types of end products (e.g., sandwich portions, strips, nuggets, etc.) to meet production goals. The method includes generally five steps. First, information on incoming products is received. Second, for each incoming product, a parameter value is calculated for each of the two or more types of end products that may be produced from the incoming product. A parameter value may be any value that indicates the suitability of an incoming product for producing a certain end product. For example, a parameter value may be a yield value (the weight of an end product that can be produced from the incoming product), and the yield value may be calculated for each of the two or more types of end products. Third, the calculated parameter values for each of the incoming products for the two or more types of end products are normalized so as to meet the production goals, while at the same time achieving optimum parameter values. In other words, the calculated parameter values are adjusted so as to meet the production goals, but are adjusted only to the extent necessary to meet the production goals so that the adjusted parameter values are still optimum within the confine of meeting the production goals. Fourth, for each incoming product, the end product with the best (e.g., the largest or highest) normalized parameter value is selected as the end product to be produced from that incoming product. Fifth, each incoming product is portioned to produce the end product that was selected in the fourth step.

In accordance with one aspect of the present invention, the classified incoming products are sorted into two or more lines (e.g., two or more conveyor belts) upstream of the portioning step (hereinafter called "upstream sorting"). The incoming products sorted into multiple lines are subsequently portioned, perhaps by multiple portioners, respectively, to produce multiple types of end products.

In accordance with another aspect of the present invention, the classified incoming products undergo continuous portioning processing on a single line (e.g., on the same conveyor belt), with each incoming product being portioned into the selected type of end product on the same line. Subsequently, downstream of the continuous portioning processing, the two or more types of portioned end products are sorted into two or more lines to be received in respective collection bins, for example (hereinafter called "downstream sorting").

In accordance with various exemplary embodiments of the present invention, a method for classifying incoming products to be portioned into two or more types of end products to meet production goals is encoded as computer-executable instructions and stored in a computer-readable medium. The computer-executable instructions, when loaded onto a computer (or processor), cause the computer to carry out a method of the present invention.

In accordance with one aspect of the invention, the computer-executable instructions cause the computer to receive feedback from results of actual sorting (upstream sorting or downstream sorting) and further to perform the step of normalizing the calculated parameter values to meet the production goals in light of the received feedback. The feedback may include information such as: a flow rate of actual sorting; a rate of change of the flow rate of actual sorting; a status of a buffer used in actual sorting, total end products produced, and production trends.

In accordance with another aspect of the invention, the parameter value to be used to indicate the suitability of an incoming product for producing a certain end product may include, for example, a yield value (the weight of an end product to be produced), a yield percentage value (the weight of an end product divided by the weight of the incoming product from which the end product is to be produced), a total (economic) value (e.g., the value of an end product + the value of any trim produced during portioning of the end product − the cost of the incoming product from which the end product is to be produced), a value indicating lack of defects in an incoming product, a geometric attribute value of an incoming product, and a visual attribute value of an incoming product.

In accordance with yet another aspect of the present invention, the calculated parameter values for the two or more types of end products are normalized by adding an adjustment value to, or multiplying an adjustment factor with, each of the calculated parameter values. A specific adjustment value or adjustment factor is found for each of the two or more types of end products.

In accordance with still another aspect of the invention, the computer-executable instructions continually (e.g., periodically, or upon a user request) perform the steps of: (a) receiving information on additional incoming products; (b) calculating, for each of the additional incoming products, a parameter value for each of the two or more types of end products that may be produced from the additional incoming product; (c) normalizing the calculated parameter values so as to meet the production goals while achieving optimum parameter values; (d) for each additional incoming product, selecting the end product with the best (e.g., the largest) normalized parameter value as the end product to be produced therefrom; and (e) portioning each incoming product to produce the end product selected in (d) above.

In accordance with another aspect of the invention, the production goals may entail: (a) weight values of the two or more types of end products to be produced (e.g., X pounds of type A end products, Y pounds of type B end products, etc.); (b) weight percentage values of the two or more types of end products to be produced (e.g., X weight percentage of type A end products and Y weight percentage of type B end products, where X+Y=100); (c) efficiently sorting the incoming products to be portioned (upstream sorting) to collection bins, for example (batch processing); (c') efficiently sorting the portioned end products (downstream sorting); (d) sorting the incoming products to continuous portioning processing (upstream sorting) to be carried out at an optimal capacity; and (e) sorting the incoming products (upstream sorting), both to collection bins and to continuous portioning processing, to be carried out at an optimal capacity. In accordance with a further aspect of the present invention, the production goals may be modified continually (e.g., periodically, upon a user request, or to compensate for the over- or under-achieved production goals). Then, the step of normalizing the parameter values may be performed to meet the modified production goals.

In accordance with various exemplary embodiments of the present invention, a system is provided for classifying incoming products to be portioned into two or more types of end products to meet production goals. The system includes a processor, a scanner coupled to the processor for scanning incoming products, and at least one portioner also coupled to the processor for portioning the incoming products according to the classification. The processor is configured to perform the steps of: (i) receiving the scanned information of the incoming products from the scanner; (ii) for each incoming product, calculating a parameter value for each of the two or more types of end products that may be produced from the incoming product; (iii) normalizing the calculated parameter values for the incoming products for the two or more types of end products, respectively, so as to meet the production goals while achieving optimum parameter values; (iv) for each incoming product, selecting the end product with the best (e.g., the largest) normalized parameter value as the end product to be produced therefrom; and (v) directing the portioner to portion each incoming product to produce the end product selected in step (iv) above.

In accordance with one aspect of the present invention, the system further includes an upstream product diverter configured to automatically sort the incoming products, upstream of the portioner, into two or more lines for producing the two or more types of end products, respectively. The incoming products diverted onto the two or more lines may then be portioned, by two or more portioners respectively, into the two or more types of end products. In some embodiments, at least one of the two or more lines may send the upstream-sorted incoming products to a collection bin. In these embodiments, the processor may be configured to perform the further steps of: (a) receiving feedback from results of actual upstream-sorting to the collection bin; and (b) normalizing the calculated parameter values for the incoming products for the two or more types of end products, respectively, so as to meet the production goals in light of the received feedback. The feedback information may include, for example, a flow rate of actual upstream-sorting to the collection bin; a rate of change of the flow rate of actual upstream-sorting to the collection bin, total incoming products collected in the bin, and production (or collection) trends. In other embodiments, at least one of the two or more lines may send upstream-sorted incoming products to continuous portioning processing. In these embodiments, the processor may be configured to perform the further steps of: (a) receiving feedback from results of actual upstream-sorting to the continuous portioning processing; and (b) normalizing the calculated parameter values for the incoming products so as to meet the production goals in light of the received feedback. The feedback information may include, for example, a flow rate of actual upstream-sorting through the continuous portioning processing; a rate of change of the flow rate of actual upstream-sorting through the continuous portioning processing; a status of a buffer used in the continuous portioning processing, total end products produced, and production trends.

In accordance with another aspect of the present invention, the system may further include a downstream product diverter configured to automatically sort the portioned end products, downstream of the portioner, into two or more lines. In this embodiment, all incoming products undergo continuous portioning processing on a single line, perhaps by a single portioner, to be portioned into two or more types of end products. Thereafter, downstream of the portioner, the downstream product diverter sorts the two or more types of portioned end products onto the two or more lines, respectively. In some embodiments, at least one of the two or more lines may send the sorted end products to a collection bin. In these embodiments, the processor may be configured to perform the further steps of: (a) receiving feedback from results of actual downstream-sorting into separate end products (e.g., as received in separate collection bins); and (b) normalizing the calculated parameter values for the incoming products for the two or more types of end products, respectively, so as to meet the production goals in light of the received feedback. The feedback information may include, for example, a flow rate of actual downstream-sorting following the continuous portioning processing; a rate of change of the flow rate of actual downstream-sorting following the continuous portioning processing, a status of a buffer used in the continuous portioning processing, total end products produced, and production trends.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
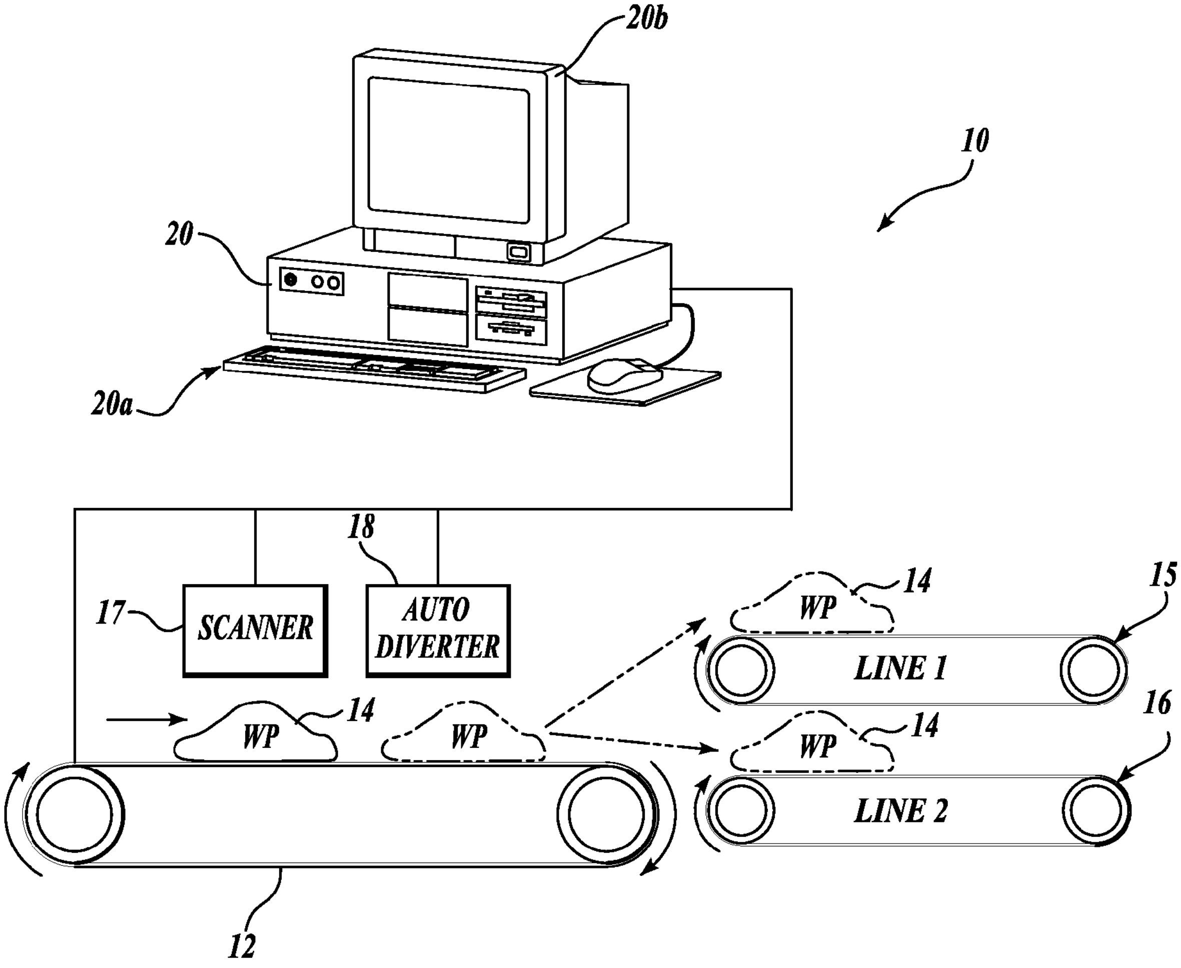
FIG. 1 illustrates a system suitable for use in performing a method of the present invention, wherein the system is operated to process and classify incoming workpieces (WP)

FIG. 1 schematically illustrates a system 10 suitable for implementing one embodiment of the present invention. The system 10 includes a conveyor 12 for carrying an incoming workpiece (WP) 14 to be upstream-sorted into multiple lines 15, 16 for producing different types of end products. The system 10 further includes a scanner 17 for scanning the workpiece 14. The system 10 may still further include an upstream auto-diverter 18 for automatically diverting the incoming workpiece 14 into different lines 15, 16. The conveyor 12, scanner 17, and upstream auto-diverter 18 are coupled to, and controlled by, a processor 20. The processor 20 includes an input device 20*a* (keyboard, mouse, etc.) and an output device 20*b* (monitor, printer, etc.). While the processor 20 is illustrated to be a single processor, a network of multiple processors may also be used to form the processor 20. Generally, the scanner 17 scans in the workpiece 14 to produce scanning information representative of the workpiece, and forwards the scanned information to the processor 20. The scanner 17 may be of a variety of different types, including a video camera to view the workpiece 14 illuminated by one or more light sources (not shown). In lieu of a video camera, the scanner 17 may instead utilize an x-ray apparatus for determining the physical characteristics of the workpiece 14, including its shape, mass, and weight, as described in U.S. Pat. No. 5,585,603, which is herein incorporated by reference.

The processor 20 analyzes the scanned information to develop a thickness profile of the scanned workpiece 14. The processor 20 also develops an area and/or volume distribution of the scanned workpiece 14. The processor 20 then models the workpiece 14 to simulate portioning the workpiece 14 into two or more types of end products of specific physical criteria, including, for example, shape, weight, thickness, and size. In the illustrated example embodying the upstream sorting (i.e., sorting of incoming products upstream of the portioning step), each of the lines 15 and 16 for producing a specific type of end products includes a cutter, trimmer, etc. (not shown) which are necessary to produce the specific type of end products.

The present invention is directed to classifying incoming products to produce two or more types of end products so as to optimally meet overall production goals. As used herein, the term "production goals" are used to cover a broad range of goals that a user wishes to meet during and/or at the end of each portioning process. For example, the production goals may define a final output of a portioning process, such as the specific quantities or weights of various types of end products to be produced (e.g., X pounds of type A end products, Y pounds of type B end products, etc.) or the specific weight percentage of each end product to be produced relative to the total weight of all end products (e.g., X % weight of type A end products, Y % weight of type B end products, Z % weight of type C end products, wherein X+Y+Z=100).

As further examples, the production goals may define a broad range of desirable portioning process configurations or desirable (e.g., efficient) portioning processes themselves. For example, a portioning process may be configured as a batch process (e.g., upstream-sorting all incoming products into collection bins for later processing/portioning), a continuous process (e.g., upstream-sorting all incoming products and directing them to multiple active portioning lines), or a hybrid of batch and continuous processing. When a batch process is used, it may be desirable to monitor the upstream-sorting process to ensure that the incoming products are filling up the collection bins properly in terms of, for example, a flow rate of actual upstream-sorting to the collection bin; a rate of change of the flow rate of actual upstream-sorting to the collection bin, total incoming products collected in the bin, etc. When a continuous or hybrid process is used, it may be desirable to monitor the upstream-sorting process to ensure that each of the continuous process lines for processing (e.g., portioning) the upstream-sorted incoming products is operated at maximum capacity. For example, when line 1 for producing type A end products is operating at its maximum capacity while line 2 for producing type B end products has little or no incoming products to process, then it may be desirable to divert some of the incoming products from line 1 to line 2 to make a maximum use of the overall system. Thus, in these examples, the production goals may define goals that a user wishes to meet during an upstream-sorting/portioning process itself, such as efficient upstream-sorting into collection bins during batch processing, and efficient use of each production (or portioning) line at capacity during continuous or hybrid processing. These production goals and how they can be met will be further described below in reference to FIGS. 4A-4C. It should be noted that the production goals may be continually modified during an upstream-sorting/portioning process.

As used herein, a "parameter" or "parameter value" means any value that indicates the suitability or desirability of an incoming product for producing a certain end product. For example, a parameter value may be a yield (i.e., the weight of an end product that can be produced from an incoming product), a yield percentage (i.e., the weight of an end product divided by the weight of the incoming product from which the end product is produced), or a total (economic) value of an end product (e.g., the value of an end product + the value of any trim produced when the end product is portioned from an incoming product − the cost of the incoming product). It should be understood that a total value of an end product may be defined or calculated in various other ways to capture a specific economic value in each application. For example, a total value may include the portioning process cost, labor cost, equipment lease cost, a net profit from the portioning process, etc.

Parameter values for use in a method of the present invention may also include certain geometrical or visual attribute values of incoming products, which indicate the suitability of the incoming products for producing various types of end products. For example, certain geometric shapes, sizes, colors, or texture of incoming products may be deemed to indicate their suitability for producing certain end products. As one specific example, a larger incoming product may not be best suited for producing certain smaller-size end products because it will take a longer time to complete portioning of the larger incoming product into a number of the smaller-size end products. Thus, the (small) size of an incoming product relative to a particular end product may be used as a parameter to indicate the suitability of the incoming product for producing the end product. As another example, lack of defects, such as holes, large tears, bone, fat, etc., found in incoming product may be used as a parameter to indicate the suitability of the incoming product for use in producing a certain end product. Note that lack of defects may be closely correlated with yield or yield percentage, since any presence of defects that would make the incoming product unsuited for producing a certain end product will result in the reduced or minimum yield or yield percentage value for the same end product.

It should be noted that some of these parameters may be used to indicate that certain incoming products are not suited for producing any type of end products. For example, an unusually large size of the incoming product may significantly slow down the portioning process to be unsuitable for producing any type of end products. As another example, the presence of serious defects in the incoming product, as quantified in terms of a parameter value, may indicate that the incoming product is not suited for producing any type of end products. If so, those incoming products that are determined to be wholly unusable may be simply removed from the production line or may be tagged (in software) so as not to undergo any subsequent portioning processing.

In accordance with the present invention, the parameter values are normalized so as to meet the production goals while at the same time achieving "optimum" parameter values. As used herein, meeting the production goals while achieving "optimum" parameter values, or "optimally" meeting the production goals, means meeting the production goals while achieving or maintaining a parameter value at its optimum level, i.e., the best possible level achievable while at the same time meeting the production goals.

As used herein, to "normalize" parameter values means to adjust or conform the parameter values to the production goals. In other words, the production goals are used as the standards to be met. Thus, the initial value of a parameter (e.g., yield) calculated to indicate the suitability of a certain incoming product for producing a particular end product is adjusted (or normalized) to an "optimum" parameter value, which may not be the best (e.g., the highest) possible parameter value for this particular end product, but is still the optimum parameter value that could meet the production goals. For example, even when some incoming products may have the highest parameter values associated with type A end products and thus may be assessed as best suited for producing type A end products, if the production goals for end products A have already been met or are about to be met, then these incoming products should be classified to produce other end products. To that end, the parameter values indicating the suitability of these incoming products for producing type A end products may be "normalized" (e.g., lowered from the initial values relative to the parameter values of other types of end products) in order to meet the overall production goals.

Figure 2A:
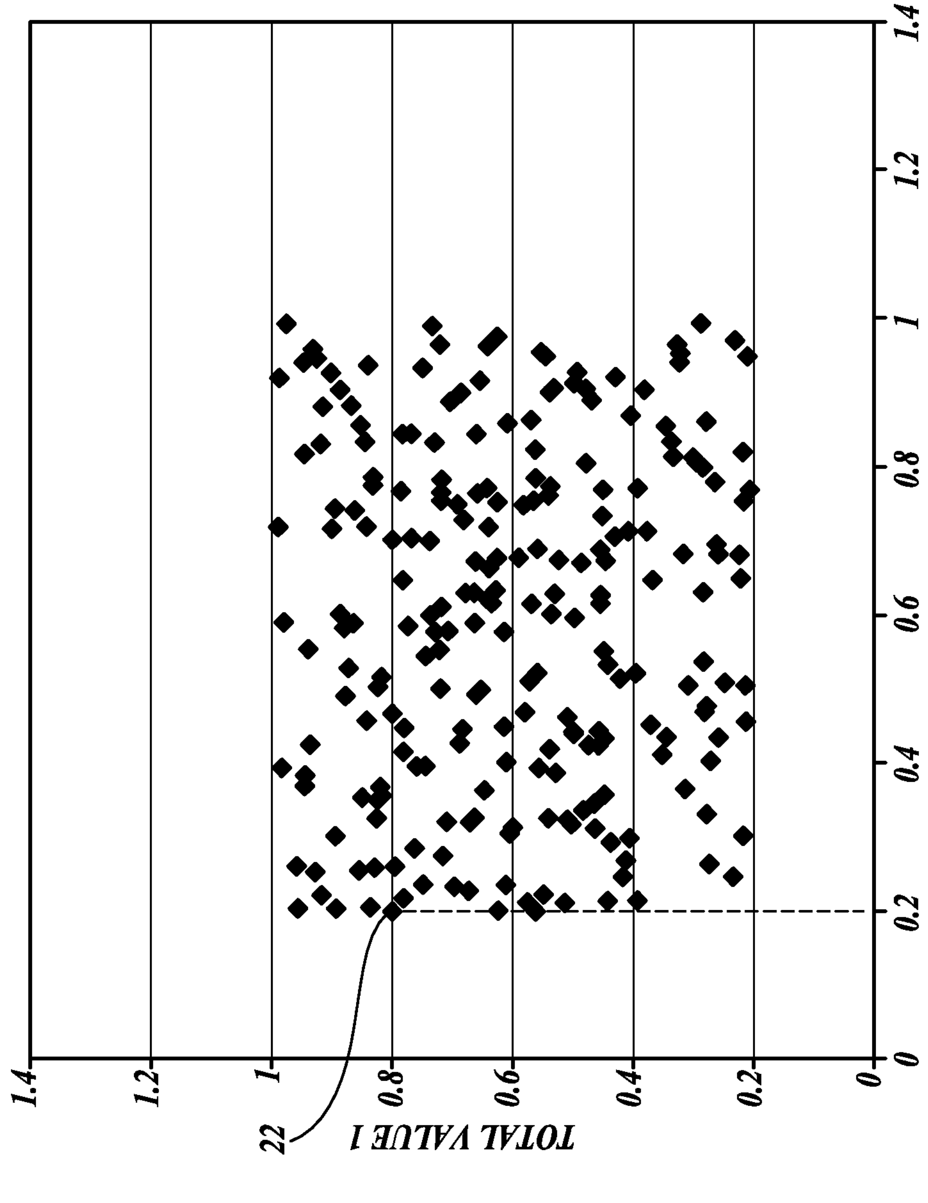
FIGS. 2A-2C illustrate a method of normalizing parameter values for incoming products for two or more types of end products, respectively, so as to meet production goals, in accordance with the present invention.
Figure 2B:
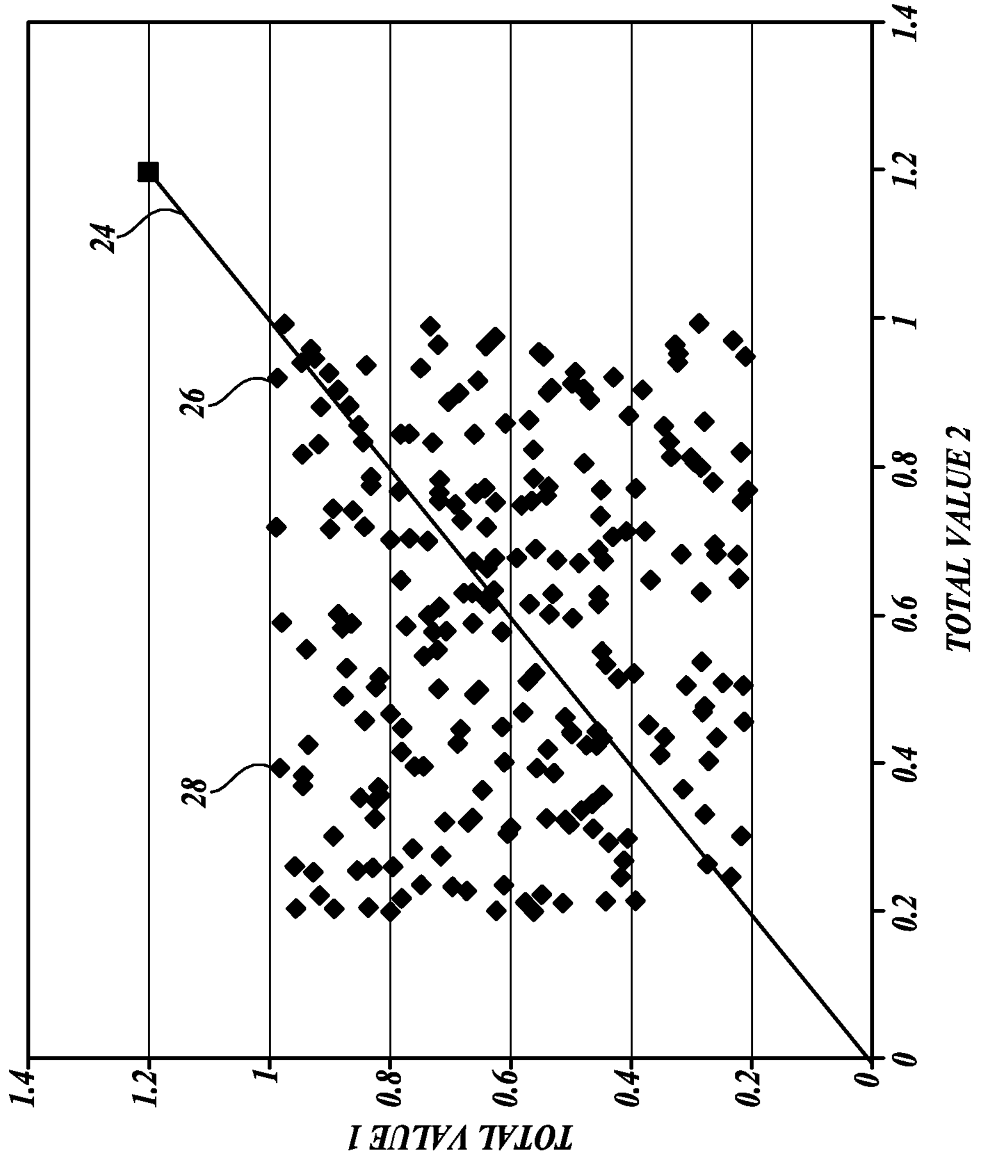
Figure 2C:
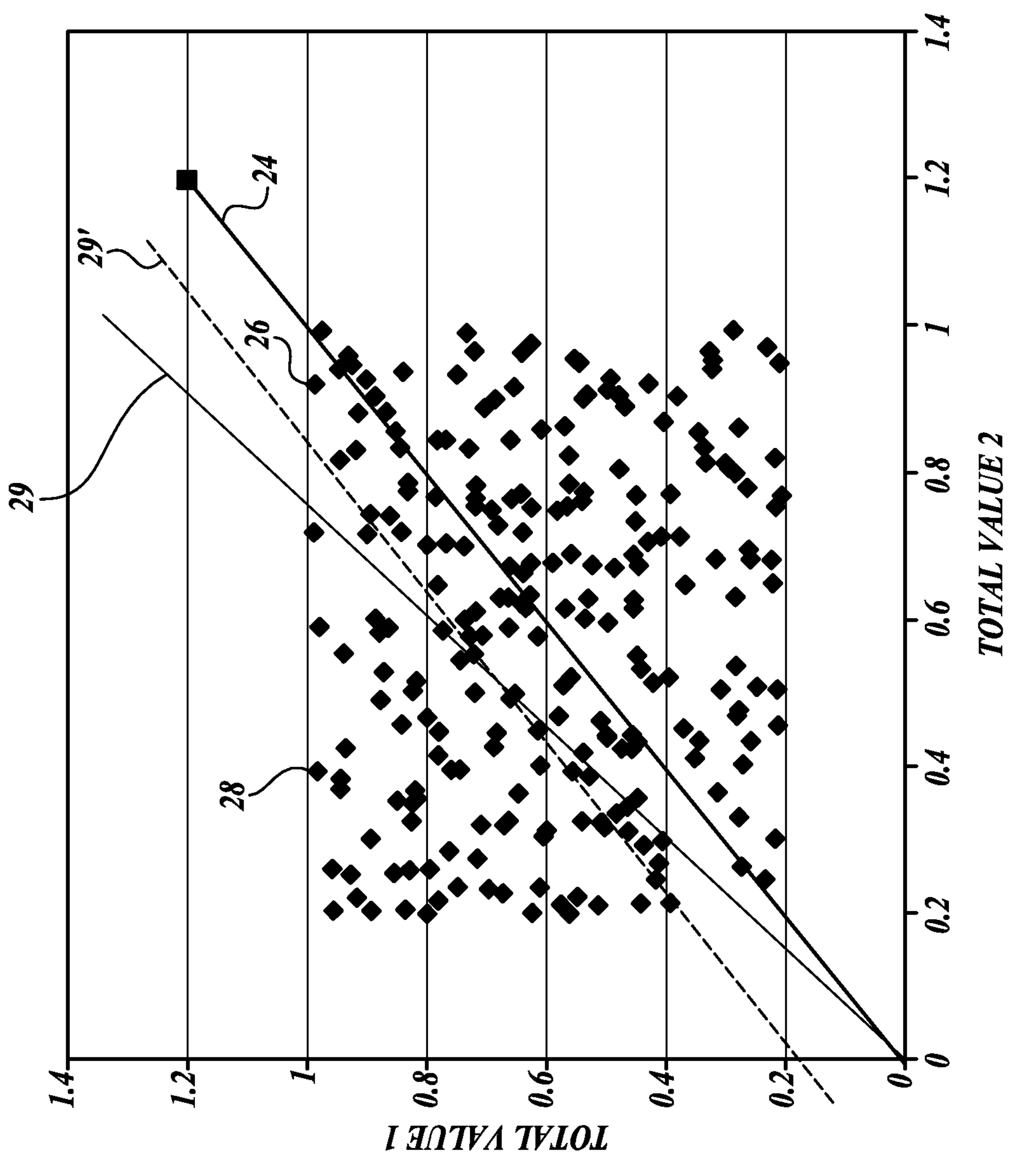

The concept of normalizing parameter values so as to meet the production goals is now described and illustrated in FIGS. 2A-2C.

In the present description, it is assumed that there are a number of incoming products (e.g., chicken breast butterflies) to be classified to produce two or more types of end products (e.g., sandwich portions, strips, nuggets, etc.). A parameter to be used in this illustration below is the total value of an end product (e.g., the value of an end product + the value of any trim produced during production of the end product − the cost of the incoming product from which the end produce is produced). Such total value may be readily calculated based on the known weight of an incoming product, the known weight of each type of end product to be produced, and values per weight of the incoming product, end product, and trim. It is further assumed that the production goals to be met in the present illustration require a fixed (weight) percentage of each type of end products to be produced (e.g., X % weight of end products 1 and Y % weight of end products 2, where X+Y=100). The goal here is to meet the production goals while at the same time maximizing the total value that can be derived from each of the incoming products to be processed and portioned. To that end, first, the population characteristics of the incoming products may be ascertained.

FIG. 2A is a graph showing the population characteristics of the incoming products, wherein each dot represents one incoming product and is plotted to indicate the total value if used to produce end product 1 (along the "Total Value 1" axis") and the total value if used to produce end product 2 (along the "Total Value 2" axes). For example, dot 22 represents an incoming product, which will have the total value of 0.8 if used to produce end product 1, and will have the total value of 0.2 if used to produce end product 2. The units of the axes may be any monetary or other units of (economic) value to the users. Though FIG. 2A shows a 2-dimensional graph to illustrate a simple case where the incoming products are to be classified to produce two types of end products 1 and 2, it should be understood that an N-dimensional graph may be similarly created for a case where the incoming products are classified to produce N types of end products.

If there are no specific production goals or if the production goals are to be simply ignored, then the highest total value would be achieved by classifying each end product to produce the end product that gives the highest total value. For example, the incoming product represented by dot 22 in FIG. 2A should be classified to produce end product 1, because the total value derived from producing end product 1 out of this incoming product is 0.8, which is higher than the total value derived from producing end product 2 out of the same incoming product, 0.2. Graphically, the determination as to which type of end product should be produced from each incoming product can be made, in the 2-dimensional case, by drawing a 45-degree dividing line, along which the total value for end product 1 equals the total value for end product 2. FIG. 2B shows the same graph as FIG. 2A, but with a 45-degree dividing line 24. If the incoming products are to be classified without any regard to the production goals, then the incoming products above the dividing line 24 should be classified to produce end products 1 (because the total value derived from producing end product 1 out of each of these incoming products is higher than the total value derived from producing end product 2 out of the same incoming product). Likewise, the incoming products below the dividing line 24 should be classified to produce end products 2.

In many cases, classification done without any regard to specific production goals will result in an undesirable imbalance among various end products produced, contrary to the production goals. For example, referring to FIG. 2B, the 45-degree dividing line 24 classifies the incoming products into two generally equal amounts (quantities) for producing end products 1 and 2, respectively. Also, since the weight of each end product 1 and the weight of each end product 2 are known, the total weight of end products 1 and the total weight of end products 2 to be produced from the incoming products can be calculated. If the ratio between the total weight of products 1 and the total weight of products 2 is, for example, 7:3, while the production goals actually require the total weight ratio of 1:1, then the production goals are not met based on the current classification method. In this example, even though the highest total value is derived with respect to each individual incoming product, too much products 1 and too little end products 2 are produced contrary to the production goals.

In order to meet the production goals while at the same time achieving optimum total values, in accordance with the present invention, the total values that are initially calculated are normalized. In the illustrated example of FIG. 2B, the normalization process can be considered as the process of allowing a determination as to which of the incoming products that are initially designated to produce end products 1 should be re-designated to produce end products 2 instead, so as to meet the production goals. The incoming products to be re-designated should be those with the least loss of value, or with the lowest conversion cost. For example, between dots 26 and 28 of FIG. 2B, which both represent the incoming products that are initially designated to produce end products 1, dot 26 has the lowest conversion cost because, although the total value as an end product 1 is roughly the same for both dots 26 and 28, the total value when converted into an end product 2 is higher for dot 26 (about 1.0) than for dot 28 (about 0.4). In other words, between dots 26 and 28, dot 26 has the least loss of value when converted to produce end product 2. The conversion (or re-designation) of the incoming products in this manner may continue until the production goals are met. In the present example, where the initial classification produced the total weight ratio of 7:3, for example, while the production goals actually require the ratio of 5:5, the conversion of the incoming products with the lowest conversion cost from end products 1 to end products 2 continues until the ratio of 5:5 is achieved.

For the purpose of simplifying the explanation, assume that the production goals in the present example are set in terms of the total value for each conversion alternative (end products 1 and 2). Then, the conversion cost associated with converting an incoming product, which was initially designated to produce end product 1, to instead produce end product 2, can be expressed as:

$$\text{Conversion Cost}=(V1-V2)/V2=V1/V2-1$$

where V1 is the total value derived from producing an end product 1 from an incoming product, and V2 is the total value derived from producing an end product 2 from the same incoming product. FIG. 2C graphically illustrates the concept of conversion cost and the normalization process in accordance with the present invention. In FIG. 2C, the line 24 is the 45-degree dividing line, while a line 29 is a new dividing line which has been moved from the 45-degree dividing line 24 so as to meet the production goals (i.e., by converting some of the incoming products, previously designated to produce end products 1, to produce end products 2 instead). The term V1/V2 in the Conversion Cost formula above is the slope of the new dividing line 29, and 1 is the slope of the 45-degree dividing line 24. As the new dividing line 29 is further rotated with respect to the 45-degree dividing line 24, the more incoming products are converted to produce different end products, at an increased conversion cost of V1/V2−1.

Thus, the process of normalizing parameter values can be considered as a process necessary to find the new dividing line 29, which classifies all incoming products to produce multiple types of end products to meet the production goals while at the same time maintaining the parameter values at their optimum levels (e.g., at the lowest total conversion cost). The new dividing line 29 can be found, for example, using linear least squares fitting, i.e., by finding a linear function that is least squares fitted to a set of dots, which represent the incoming products that are to be converted from one end product type to the other end product type so as to meet the production goals. In the present example, the new dividing line 29 can be expressed as:

$$\text{New Dividing Line: Total Value 1}=((V1/V2)*\text{Total Value 2})+B$$

where (V1/V2) is the slope of the dividing line 29, and B is its intercept with the axis of Total Value 1.

In general, the population of incoming products has a similar set of defining statistical characteristics over time. Thus, once the values (V1/V2) and B are found, they may be fairly constant. Then, the same new dividing line 29 can be used to classify incoming products over time. It is certainly possible, and perhaps may be even preferable, however, to continually calculate and update the values (V1/V2) and B based on real data of new incoming products. In other words, the new dividing line 29 can be continually defined in view of the population characteristics of the incoming products that may change over time.

Continuing the simplified example, the above-described concept of conversion cost and normalization can be applied in 3 or more dimensions (i.e., where the incoming products are to be classified to produce 3 or more types of end products). In this connection, the inventors of the present application have discovered that finding the slope (V1/V2) for the new dividing line to redistribute incoming products is analogous to multiplying different adjustment factors (or adding different adjustment values) to the parameter values (e.g., total values) of different types of end products, respectively, to achieve the same redistribution of the incoming products. Based on this discovery, the inventors have further found that any N-dimensional space can be divided into N sectors by multiplying an adjustment factor (or adding an adjustment value) to each of the parameter values (e.g., total values) associated with N types of end products, respectively, in a manner similar to how the 2-dimensional space can be divided into 2 sectors by changing the slope of the 45-degree dividing line 24 to that of the new dividing line 29. This novel approach discovered by the inventors transforms the total values of N types of end products into an N-dimensional space to thereby permit comparison among the total values of N types of end products.

Multiplying each of the calculated parameter values for the two or more types of end products, respectively, by an adjustment factor associated with the corresponding end product results in producing the new dividing line 29 of FIG. 2C. As described above, the new dividing line 29 has been rotated (i.e., pivoted about the origin) from the 45-degree dividing line 24 so as to meet the production goals (i.e., by converting some of the incoming products, previously designated to produce end products 1, to produce end products 2 instead).

Adding to each of the calculated parameter values for the two or more types of end products, respectively, an adjustment value associated with the corresponding end product results in producing another type of new dividing line 29' also shown in FIG. 2C. Unlike the previous dividing line 29 produced by multiplying adjustment factors, the new dividing line 29' produced by adding adjustment values is shifted (offset) relative to the 45-degree dividing line 24 so as to extend substantially in parallel to the 45-degree dividing line 24. Still, both of the normalizing methods produce essentially the same results, in that the new dividing line 29' too is set so as to meet the production goals (i.e., by converting some of the incoming products, previously designated to produce end products 1, to produce end products 2 instead). Note that the normalizing results achieved by the new dividing line 29 and by the new dividing line 29' are essentially the same, especially where the data dots are located farther away from the origin and when the pivoting angle of the dividing line 29 is relatively small.

Thus, the process of normalizing parameter values can be considered as a process necessary to find the new dividing line 29 or the new dividing line 29', either of which classifies all incoming products to produce multiple types of end products to meet the production goals while at the same time maintaining the parameter values at their optimum levels.

In one embodiment, N adjustment factors to be multiplied may be constrained to multiply together to a product of 1, so as to keep the adjustment factors from drifting upon subsequent corrections of the adjustment factors. Likewise, N adjustment values to be added may be constrained to have a mean value of 0 so as to prevent their drifting. As discussed above, since the population of incoming products has a similar set of defining statistical characteristics over time, the adjustment factor to be multiplied (or adjustment value to be added) to each type of end product, once found, should be fairly constant. However, as the population characteristics of the incoming products may change over time, the adjustment factor or adjustment value may be continually updated.

In another embodiment, where N parameter values are calculated for N types of end products, respectively, one of the N parameter values for a selected end product may be selected to be not adjusted, i.e., not to be multiplied by an adjustment factor or added with an adjustment value. Instead, the selected parameter value is set (unadjusted), while each of the other parameter values calculated for the non-selected ones of the N types of end products are adjusted by, for example, multiplying a corresponding adjustment factor or adding a corresponding adjustment value thereto. As with the previous embodiment, this embodiment is also advantageous in preventing the adjustment factors/values (used to adjust the non-selected parameter values) from drifting upon continuous corrections and updating of the adjustment factors/values.

Figure 3:
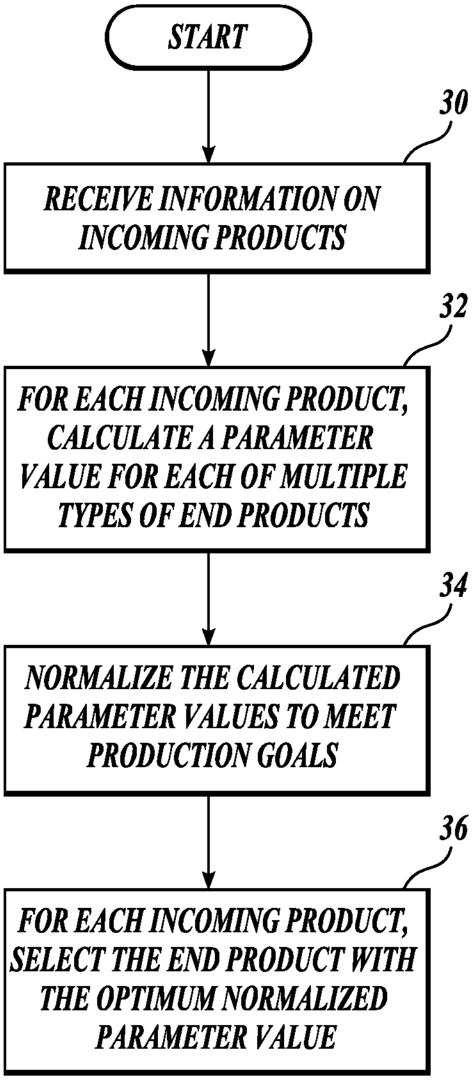
FIG. 3 is a flow chart illustrating a method for classifying incoming products to be portioned into two or more types of end products to optimally meet production goals, in accordance with the present invention.

FIG. 3 is a flow chart illustrating a method of the present invention for classifying incoming products to be portioned into two or more types of end products to meet production goals. In step 30, information on incoming products is received. For example, this step may be performed when the processor 20 receives scanned information of incoming products (or workpieces 14 in FIG. 1) from the scanner 17. In step 32, for each incoming product, a parameter value is calculated for each of the two or more types of end products that may be produced from the incoming product. For example, if a yield value (the weight of an end product) is used as a parameter, then the yield value is calculated for each type of end product that may be produced from the particular incoming product. In step 34, the calculated parameter values for the incoming products for the two or more types of end products, respectively, are normalized so as to meet the production goals while at the same time achieving optimum parameter values. Lastly, at step 36, for each incoming product, the end product with the best (e.g., the largest) normalized parameter value is selected as the end product to be produced from the incoming product. As discussed in detail above in reference to FIGS. 2A-2C, the process of normalizing parameter values to meet the production goal and selecting an end product with the best normalized parameter for each incoming product may be achieved by finding a dividing line, which classifies the incoming products to produce different types of end products to meet the production goals. In one embodiment, all of these steps 30-36 may be performed by the processor 20. Further, in various exemplary embodiments of the present invention, these steps 30-36 are coded in computer-executable instructions and stored in a computer-readable medium (i.e., a computer storage medium, such as a hard disk, an EPROM, a CD-ROM, optical/magnetic disks, tapes, etc.). The computer-executable instructions, when loaded onto a computer (processor), cause the computer to carry out the method of the present invention.

In various exemplary embodiments, when a particular end product to be produced from each incoming product is selected in step 36, such selection may be promptly executed to actually classify the incoming product. Further, such selection may be stored in the memory of the processor 20.

Figure 4A:
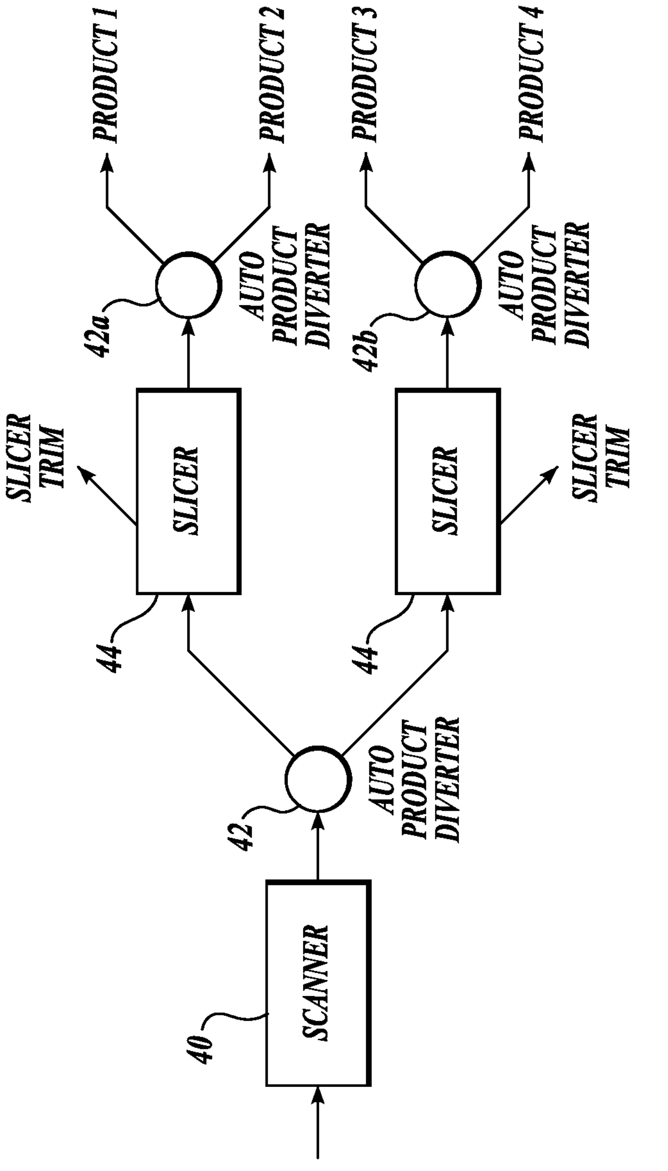
FIGS. 4A-4C illustrate three alternative configurations of a system for upstream-sorting incoming products to be portioned into two or more types of end products, in accordance with the present invention.
Figure 4B:
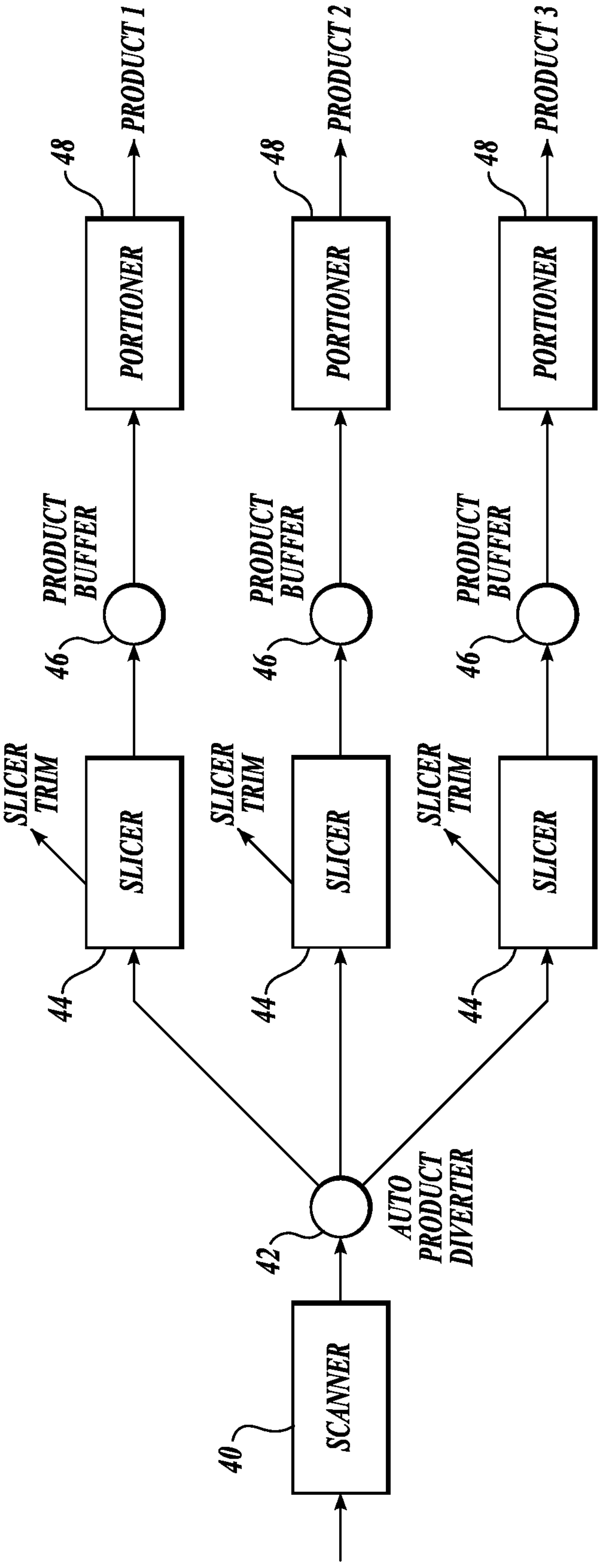
Figure 4C:
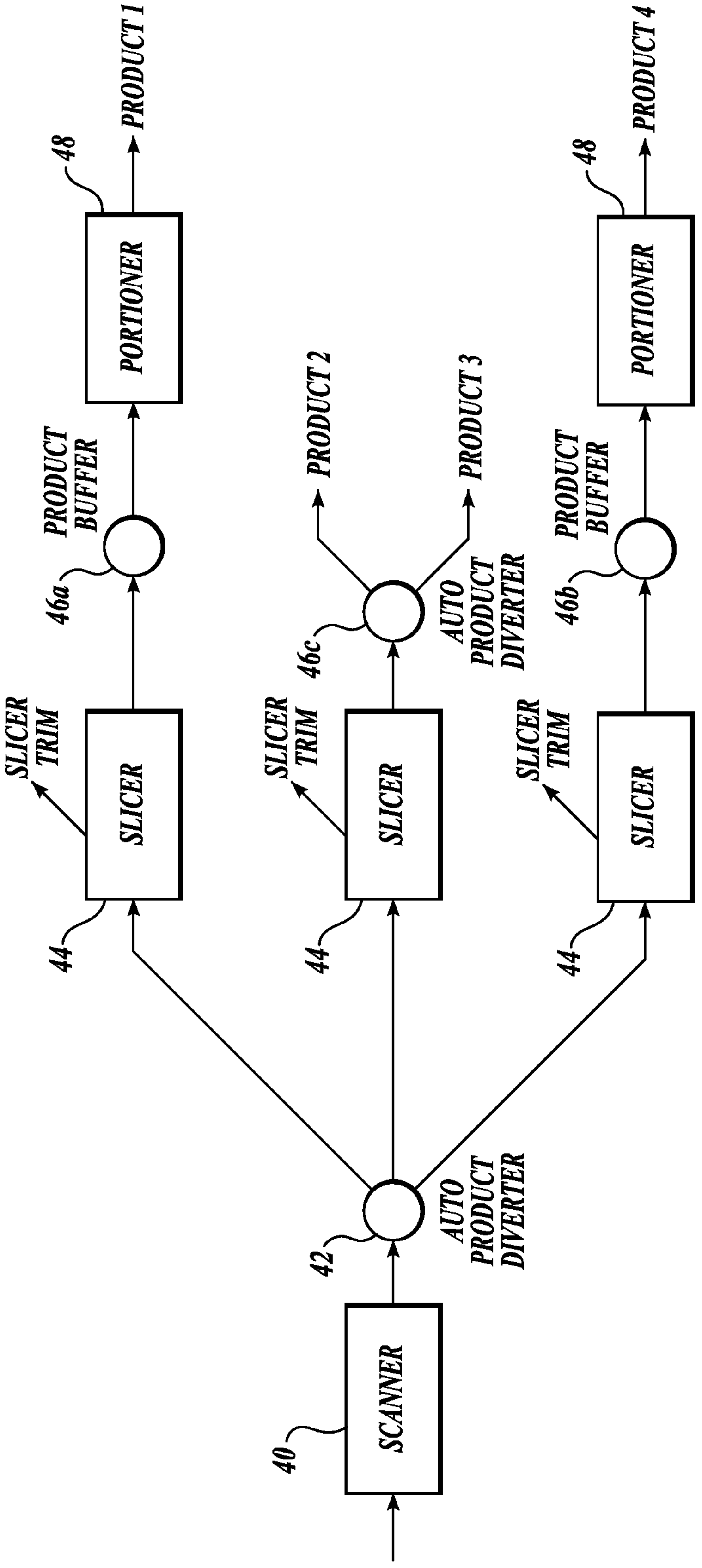
Figure 4D:
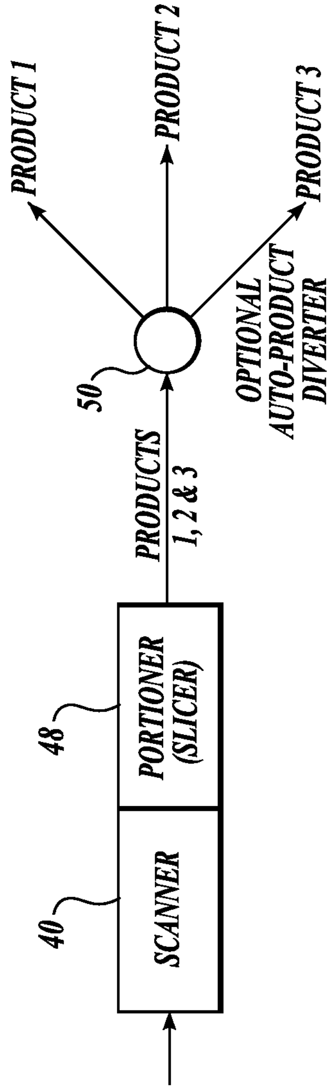
FIG. 4D illustrates a further alternative configuration of a system for downstream-sorting two or more types of end products portioned from incoming products, in accordance with the present invention.

As defined above, the term "production goals" means a broad range of goals that a user wishes to meet during and/or at the end of each portioning process. For example, the production goals may define a broad range of desirable portioning process configurations or desirable (e.g., efficient) portioning processes themselves. FIGS. 4A, 4B, and 4C illustrate three exemplary upstream-sorting and portioning process configurations using batch processing, continuous processing, and hybrid processing, respectively, which may be used to define the production goals. FIG. 4D illustrates an exemplary downstream-sorting process configuration that uses in-line (or single-line) classification and continuous portioning processing, to be described more fully below.

FIG. 4A illustrates batch processing, in which all incoming products are upstream-sorted into collection bins for later processing/portioning. Incoming products are first scanned by a scanner 40 and classified to produce different types of end products according to a method of the present invention. Thereafter, the classified incoming products are automatically diverted by an upstream auto-product diverter 42 [or 18 in FIG. 1] onto two different lines, each equipped with a servo slicer 44. Each of the servo slicers 44 performs a predefined slicing operation to the incoming product to produce a slicer trim. Typically, a slicing operation is performed in the horizontal direction, e.g., in the direction parallel to a conveyor surface carrying the incoming products such that the cut surface of each incoming product lies generally in parallel with the conveyor surface. The sliced incoming products on each line are forwarded to another upstream auto-product diverter 42*a* (or 42*b*), which further divides the sliced incoming products into two bins, to be later portioned to produce end products 1 and 2 (or 3 and 4), respectively. In the example of FIG. 4A, since the incoming products have already undergone the slicing operation along 1-axis (e.g. Z-axis) at the servo slicer 44, the portioning operation may involve only 2-axis portioning (along X-axis and Y-axis), i.e., in the vertical direction such that the cut surfaces of each incoming product extend generally perpendicular to the surface supporting the incoming product. The production goals in the illustrated example may be the weight values (yields) or weight percentage values of all "finished" products, i.e., the sliced incoming products collected in the bins to be later portioned into various types of end products.

While the example of FIG. 4A above involves a slicing step (at the servo slicer 44), which is separately performed from a downstream portioning step to be applied to products 1-4, it should be noted that the term "portioning" as used in the present application may include any type of, or any combination of, product cutting. Specifically, as used in the present application, the term "portioning" may mean slicing alone, portioning alone, or any other type of product cutting, and any combination of slicing, portioning, and other type of product cutting.

The production goals may be further defined in terms of any value that measures the efficiency or other desirability of the batch processing. For example, whether the incoming products are properly filling up the collection bins may be measured in terms of, for example, a flow rate (e.g., X % of the total incoming products to be collected in one bin is collected during time period Y), a rate of change of the flow rate, total incoming products (e.g., X weight values of the incoming products for producing type A end products have been collected in one bin, and Y weight values of the incoming products for producing type B end products have been collected in another bin), production trends (e.g., the incoming products for producing type A end products have been filling up a bin at an increasingly faster rate, while the incoming products for producing type B end products have been filling up another bin at an increasingly slower rate), etc. These values may be used to define the production goals as desired by the user for the batch processing. Then, the normalization of parameter values (e.g., yield values, yield percentage values, total values, etc.) may be carried out to meet the production goals, while at the same time achieving optimum parameter values.

In various exemplary embodiments of the present invention, results of actual upstream-sorting and batch processing are fed back to the processor 20 to be used in normalizing the parameter values. The information to be fed back may include, for example, a flow rate, a rate of change of the flow rate, total incoming products collected, and production trends. In other words, the processor 20 may receive feedback information indicating the current level of achievement of the production goals, which in turn may indicate how likely or well the production goals will be met at the end of the process. The processor 20 may then use this information to normalize parameter values so as to meet the production goals. For example, if the feedback information indicates that the current level of achievement of the production goals is less than optimal (e.g., under-achieved or over-achieved), the processor 20 may use the information in normalizing parameter values so as to compensate for the current level of achievement.

FIG. 4B illustrates continuous processing, in which all incoming products are upstream-sorted and directed to active portioning lines. Incoming products are scanned by a scanner 40 and classified according to a method of the present invention. Thereafter, the classified incoming products are automatically diverted by an upstream auto-product diverter 42 onto three different lines, each equipped with a servo slicer 44. Each of the servo slicers 44 performs a predefined slicing operation to the incoming product to produce a slicer trim. The sliced incoming products in each line are forwarded to a buffer conveyor 46, which is described in detail in co-assigned U.S. Pat. No. 7,500,550, titled "Conveying Conformable Products," incorporated by reference herein. Briefly, the buffer conveyor 46 is configured to receive the sliced incoming products at a possibly non-uniform frequency and present them to the downstream portioner 48 at a uniform frequency. The portioner 48 performs a predefined portioning operation to the incoming products to thereby produce end products 1, 2, or 3.

The production goals in the illustrated example may be defined to keep each of the three portioning lines filled to capacity. In general, it is highly desirable to operate each portioning line at capacity to make maximum use of the overall system. However, since the upstream auto-product diverter 42 is upstream-sorting random incoming products, there will be times when several incoming products in a row will be sent to one line, thereby overloading that line while starving the other lines. This problem may be mitigated by including the buffer conveyor 46 in each line, which can hold several extra (sliced) incoming products to thereby absorb the randomly occurring peaks and valleys in the production line and feed the (sliced) incoming products to the portioner 48 at a uniform frequency. The buffer conveyors 46 may feedback their operational status to the processor 20 so that the processor can consider the information when normalizing parameter values to meet the production goals. Specifically, when the production goals are set to keep each portioning line filled to capacity, the status of the buffer conveyor 46 used in each portioning line may be used to possibly divert some incoming products from a "busier" line to other lines. For example, if the buffer conveyor 46 of line 1 indicates that it is holding extra (sliced) incoming products while the buffer conveyors 46 of other lines indicate no extra holding, then the processor 20 may use this information in normalizing parameter values so as to convert some of the incoming products destined for line 1 to be instead upstream-sorted to other lines, to thereby meet the production goals.

As with the batch processing discussed above, the production goals for continuous processing may also be defined in terms of a flow rate (e.g., X % of the total type A end products to be produced is produced during time period Y), a rate of change of the flow rate, total end products (e.g., X weight values of type A end products have been produced, and Y weight values of type B end products have been produced), production trends (e.g., type A end products have been produced at an increasingly faster rate, while type B end products have been produced at an increasingly slower rate), etc.

FIG. 4C illustrates hybrid processing, in which some incoming products are upstream-sorted into collection bins for later processing/portioning, while other incoming products are upstream-sorted and directed to active portioning lines. Incoming products are scanned by a scanner 40 and classified according to a method of the present invention. Thereafter, the classified incoming products are automatically diverted by an upstream auto-product diverter 42 onto three different lines 43*a*, 43*b*, and 43*c*, each equipped with a servo slicer 44. Each of the servo slicers 44 performs a predefined slicing operation to the incoming product to produce a slicer trim. The sliced incoming products in the continuous-processing lines 43*a* and 43*c* are forwarded to buffer conveyors 46*a*, 46*b*, respectively, and thereafter presented to the downstream portioners 48 at a uniform frequency. The portioners 48 cut the sliced incoming products to produce end products 1 and 4, respectively. On the other hand, the sliced incoming products in the batch-processing line 43*b* are forwarded to another upstream auto-product diverter 42*c*, which further divides the sliced incoming products into two bins, to be later portioned into end products 2 and 3, respectively.

The production goals in the illustrated example may be the combination of the production goals for the continuous-processing lines 43*a* and 43*c* and the production goals for the batch-processing line 43*b*. For example, the buffer conveyors 46*a* and 46*b* may feedback their status to the processor 20 so that the processor 20 can consider the information to best meet the production goals directed to keeping each line operating at capacity. Likewise, the processor 20 may receive feedback information regarding results of the batch processing from the batch-processing line 43*b* and consider the information to best meet the production goals directed to maintaining a constant flow rate, a constant rate of a change of a flow rate, etc. In general, the normalizing process to meet the production goals responds to the state of the buffer conveyors 46*a* and 46*b* fairly quickly, while responding to the feedback information from the batch processing relatively slowly.

FIG. 4D illustrates an exemplary downstream-sorting process configuration, which uses in-line (or single-line) classification and continuous portioning processing, in which all of the incoming products are classified and portioned into two or more types of end products, respectively, on a single line (e.g., on a single conveyor belt). An optional downstream sorting step then separates the different end products. Specifically, in FIG. 4D, incoming products are scanned by a scanner 40, coupled to a processor (not shown), and classified to be portioned to produce two or more types of end products, respectively. The classified incoming products are thereafter portioned into the two or more types of end products by a portioner 48. All incoming products undergo continuous portioning processing so as to produce various types of end products ("products 1, 2, and 3") continuously or concurrently on a single line. An optional downstream auto-product diverter 50, located downstream of the portioner 48, separates the different end products for separate further processing or packaging. The downstream auto-product diverter 50 is coupled to the processor (not shown), which classifies the incoming products and controls the portioner 48 to portion each incoming product according to the classification. Since the processor records the location of each incoming product and hence each end product produced therefrom relative to the line (e.g., on a conveyor belt), the processor can direct the downstream auto-product diverter 50 to sort the portioned end products into multiple lines based on their type.

As shown in FIG. 4D and as described above, the "portioner" 48 may include a portioner alone, a slicer alone, or any type of product cutting device and, further, any combination of a portioner, slicer, and product cutting device. In one example, the portioner 48 may include only a 2-axis portioner that cuts a classified incoming product vertically (relative to the surface supporting the product) to proper weight. In another example, the portioner 48 may include both a 2-axis portioner that cuts a classified incoming product vertically, and a 1-axis slicer that cuts the classified and 2-axis portioned incoming product horizontally (relative to the surface supporting the product). Specifically, first, the 2-axis portioner may cut out a portion, whose horizontal shape fits a 2-dimensional template shape (e.g., a chicken piece shape that fits a bun coverage area/shape) but which is intentionally overweight. Thereafter, the 1-axis slicer slices (or trims) the portioned product horizontally, reducing its thickness, to proper weight. In yet another example, the portioner 48 may again include both a 2-axis portioner and a 1-axis slicer, but in this example the 2-axis portioner cuts out a portion, which is intentionally double-weight and whose horizontal shape fits a 2-dimensional template shape. The 1-axis slicer then slices the double-weight product in half, to produce two end products each with proper weight. In all of the examples above, the "portioner" 48 is producing the same end product(s), while the actual cutting steps performed in the "portioner" 48 may vary depending on each application.

In some embodiments, at least one of the two or more lines may send the sorted end products ("products 1, 2 and 3") to a collection bin. In these and other embodiments, the processor may be configured to perform the further steps of: (a) receiving feedback from results of actual downstream-sorting into separate end products (e.g., as received in separate collection bins); and (b) normalizing the calculated parameter values for the incoming products for the two or more types of end products, respectively, so as to meet the production goals in light of the received feedback. The feedback information may include, for example, a flow rate of actual downstream-sorting following the continuous portioning processing at the portioner 48; a rate of change of the flow rate of actual downstream-sorting following the continuous portioning processing at the portioner 48, a status of a buffer used in the continuous portioning processing at the portioner 48, total end products produced, and production trends.

In accordance with various exemplary embodiments of the present invention, feedback on meeting production goals is immediate because the same processor, or network of processors, that is classifying incoming products is also directing and/or monitoring the portioner 48, the buffer 46, and the auto diverter (42, 50).

As should be apparent from the foregoing description, a method and system of the present invention permit classifying incoming products to meet various production goals, while at the same time making an optimum use of each of the incoming products as measured in terms of a parameter value. The production goals may define not only the final output to be achieved in terms of the quantities of end products to be produced, etc., but also how efficiently or desirably the production process should be carried out in terms of the line capacity, cost of operation, etc. A parameter value to be used may be selected from a wide range of values that indicate the suitability of an incoming product for producing a certain end product. Accordingly, a method and system of the present invention offer great flexibility in defining and meeting production goals while at the same time deriving an optimum (maximum) value out of each incoming product.

The embodiments of the invention in which an exclusive property or privilege is claimed are defined as follows:

1. A method for classifying incoming food products into two or more types of end food products to meet specific production goals for the end food products composed of desired specific levels of production for the end food products, and thereafter portioning the incoming food products into the one or more types of end products, the method comprising:

(a) receiving information on incoming food products;

(b) for each incoming food product, based on the received information and prior to initiating portioning of each food product, calculating a parameter value for each of the two or more types of end food products that may be produced from the incoming food product, the parameter value indicating the suitability of each incoming food product for producing each type of end food product;

(c) normalizing the calculated parameter values by performing a mathematical calculation on the calculated parameter values for each of the incoming food products for the two or more types of end food products, respectively, thereby adjusting the parameter values so as to meet the production goals for each of the end food products composed of desired specific levels of production for each of the end food products while achieving optimum parameter values;

(d) for each incoming food product, selecting the end food product with an optimum normalized parameter value as the end food product to be produced therefrom; and (e) portioning each incoming food product to produce the end food product selected in step (d) above.

2. A non-transitory computer-readable tangible medium comprising computer-executable instructions for classifying incoming food products to be portioned into two or more types of end food products to meet specific production goals for the end food products composed of desired specific levels of production for the end food products and portioning the incoming food products in accordance with the classifying of the incoming food products, wherein the computer-executable instructions, when loaded onto a computer, cause the computer to perform the steps comprising:

(a) receiving information on incoming food products;

(b) for each incoming food product, based on the received information and prior to initiating portioning of each food product, calculating a parameter value for each of the two or more types of end food products that may be produced from the incoming food product, the parameter value indicating the suitability of the incoming food product for producing each type of end food product;

(c) normalizing the calculated parameter values by performing a mathematic calculation on the calculated parameter values for each of the incoming food products for the two or more types of end food products, respectively, thereby adjusting the parameter value so as to meet the production goals for each of the end food products composed of desired specific levels of production for each of the end food products, while achieving optimum parameter values; and (d) for each incoming food product, selecting the end food product with an optimum normalized parameter value as the end food product to be produced therefrom.

3. The computer-readable medium of claim 2, wherein the parameter value is selected from a group consisting of: a yield value, a yield percentage value, a total value, a value indicating lack of defects in an incoming food product, a geometric attribute value of an incoming food product, and a visual attribute value of an incoming food product.

4. The computer-readable medium of claim 2, wherein the computer-executable instructions cause the computer to:

continually perform step (a) to receive information on additional incoming food products;

continually perform step (b) to calculate, for each of the additional incoming food products, a parameter value for each of the two or more types of end food products that may be produced from the additional incoming food product;

continually perform step (c) to normalize the calculated parameter values for each of the additional incoming food products for the two or more types of end food products, respectively, so as to meet the production goals while achieving optimum parameter values;

continually perform step (d), for each additional incoming food product, to select the end food product with an optimum normalized parameter value as the end food product to be produced therefrom; and continually perform step (e) to portion each incoming food product to produce the selected end food product.

5. The computer-readable medium of claim 2, wherein the computer-executable instructions cause performance of the step of downstream-sorting the portioned end food products based on their type.

6. The computer-readable medium of claim 5, wherein the computer-executable instructions cause the computer to further perform receiving feedback from results of actual downstream-sorting and to perform step (c) in light of the received feedback.

7. The computer-readable medium of claim 6, wherein the feedback comprises information selected from a group consisting of: a flow rate of actual downstream-sorting, a rate of change of the flow rate of actual downstream-sorting, a status of a buffer used in portioning that is upstream of the downstream-sorting, total end food products produced, and production trends.

8. A non-transitory computer-readable tangible medium comprising computer-executable instructions for classifying incoming products to be portioned into two or more types of end products to meet production goals, wherein the computer-executable instructions, when loaded onto a computer, cause the computer to perform the steps comprising:

(a) receiving information on incoming products;

(b) for each incoming product, based on the received information, calculating a parameter value for each of the two or more types of end products that may be produced from the incoming product, the parameter value indicating suitability of the incoming product for producing each type of end product;

(c) normalizing the calculated parameter values for each of the incoming products for the two or more types of end products, respectively, so as to meet the production goals while achieving optimum parameter values;

(d) for each incoming product, selecting the end product with an optimum normalized parameter value as the end product to be produced therefrom;

(e) wherein said parameter value is selected from a group consisting of: a yield value, a yield percentage value, a total value, a value indicating lack of defects in an incoming product, a geometric attribute value of an incoming product, and a visual attribute value of an incoming product; and (f) wherein the total value is defined as follows: the value of an end product + the value of any trim produced during portioning of the end product − the cost of the incoming product from which the end product is to be produced.

9. A non-transitory computer-readable tangible medium comprising computer-executable instructions for classifying incoming products to be portioned into two or more types of end products to meet production goals, wherein the computer-executable instructions, when loaded onto a computer, cause the computer to perform the steps comprising:

(a) receiving information on incoming products;

(b) for each incoming product, based on the received information, calculating a parameter value for each of the two or more types of end products that may be produced from the incoming product, the parameter value indicating suitability of the incoming product for producing each type of end product;

(c) normalizing the calculated parameter values for each of the incoming products for the two or more types of end products, respectively, so as to meet the production goals while achieving optimum parameter values;

(d) for each incoming product, selecting the end product with an optimum normalized parameter value as the end product to be produced therefrom; and (e) wherein normalizing the calculated parameter values for the two or more types of end products, respectively, comprises adding to each of the calculated parameter values an adjustment value associated with the corresponding end product.

10. The computer-readable medium of claim 9, wherein the mean of all of the adjustment values to be added to the calculated parameter values for the two or more types of end products is 0.

11. A non-transitory computer-readable tangible medium comprising computer-executable instructions for classifying incoming products to be portioned into two or more types of end products to meet production goals, wherein the computer-executable instructions, when loaded onto a computer, cause the computer to perform the steps comprising:

(a) receiving information on incoming products;

(b) for each incoming product, based on the received information, calculating a parameter value for each of the two or more types of end products that may be produced from the incoming product, the parameter value indicating suitability of the incoming product for producing each type of end product;

(c) normalizing the calculated parameter values for each of the incoming products for the two or more types of end products, respectively, so as to meet the production goals while achieving optimum parameter values;

(d) for each incoming product, selecting the end product with an optimum normalized parameter value as the end product to be produced therefrom; and (e) wherein normalizing the calculated parameter values for the two or more types of end products, respectively, comprises the sub-steps of:

(i) maintaining the calculated parameter value for a selected one of the two or more types of end products; and (ii) adding to each of the calculated parameter values for the non-selected ones of the two or more types of end products an adjustment value associated with the corresponding end product.

12. A non-transitory computer-readable tangible medium comprising computer-executable instructions for classifying incoming products to be portioned into two or more types of end products to meet production goals, wherein the computer-executable instructions, when loaded onto a computer, cause the computer to perform the steps comprising:

(a) receiving information on incoming products;

(b) for each incoming product, based on the received information, calculating a parameter value for each of the two or more types of end products that may be produced from the incoming product, the parameter value indicating suitability of the incoming product for producing each type of end product;

(c) normalizing the calculated parameter values for each of the incoming products for the two or more types of end products, respectively, so as to meet the production goals while achieving optimum parameter values;

(d) for each incoming product, selecting the end product with an optimum normalized parameter value as the end product to be produced therefrom; and (e) wherein normalizing the calculated parameter values for the two or more types of end products, respectively, comprises multiplying of the calculated parameter values by an adjustment factor associated with the corresponding end product.

13. The computer-readable medium of claim 12, wherein the product of all of the adjustment factors to be multiplied with the calculated parameter values for the two or more types of end products, respectively, is 1.

14. A non-transitory computer-readable tangible medium comprising computer-executable instructions for classifying incoming products to be portioned into two or more types of end products to meet production goals, wherein the computer-executable instructions, when loaded onto a computer, cause the computer to perform the steps comprising:

(a) receiving information on incoming products;

(b) for each incoming product, based on the received information, calculating a parameter value for each of the two or more types of end products that may be produced from the incoming product, the parameter value indicating suitability of the incoming product for producing each type of end product;

(c) normalizing the calculated parameter values for each of the incoming products for the two or more types of end products, respectively, so as to meet the production goals while achieving optimum parameter values;

(d) for each incoming product, selecting the end product with an optimum normalized parameter value as the end product to be produced therefrom; and (e) wherein normalizing the calculated parameter values for the two or more types of end products, respectively, comprises the sub-steps of:

(i) maintaining the calculated parameter value for a selected one of the two or more types of end products; and (ii) multiplying each of the calculated parameter values for the non-selected ones of the two or more types of end products by an adjustment factor associated with the corresponding end product.

15. A non-transitory computer-readable tangible medium comprising computer-executable instructions for classifying incoming products to be portioned into two or more types of end products to meet production goals, wherein the computer-executable instructions, when loaded onto a computer, cause the computer to perform the steps comprising:

(a) receiving information on incoming products;

(b) for each incoming product, based on the received information, calculating a parameter value for each of the two or more types of end products that may be produced from the incoming product, the parameter value indicating suitability of the incoming product for producing each type of end product;

(c) normalizing the calculated parameter values for each of the incoming products for the two or more types of end products, respectively, so as to meet the production goals while achieving optimum parameter values;

(d) for each incoming product, selecting the end product with an optimum normalized parameter value as the end product to be produced therefrom;

(e) wherein the computer-executable instructions cause the computer to further perform the step of downstream-sorting the portioned end products based on their type; and (f) wherein the production goals are selected from a group consisting of:

(i) weight values of the two or more types of end products to be produced;

(ii) weight percentage values of the two or more types of end products to be produced; and (iii) optimal downstream sorting.

16. A non-transitory computer-readable tangible medium comprising computer-executable instructions for classifying incoming products to be portioned into two or more types of end products to meet production goals, wherein the computer-executable instructions, when loaded onto a computer, cause the computer to perform the steps comprising:

(a) receiving information on incoming products;

(b) for each incoming product, based on the received information, calculating a parameter value for each of the two or more types of end products that may be produced from the incoming product, the parameter value indicating suitability of the incoming product for producing each type of end product;

(c) normalizing the calculated parameter values for each of the incoming products for the two or more types of end products, respectively, so as to meet the production goals while achieving optimum parameter values;

(d) for each incoming product, selecting the end product with an optimum normalized parameter value as the end product to be produced therefrom; and (e) wherein the computer-executable instructions cause the computer to:

(i) receive modification to the production goals;

(ii) perform step (c) to normalize the calculated parameter values for each of the incoming products for the two or more types of end products, respectively, so as to meet the modified production goals while achieving optimum parameter values;

(iii) perform step (d), for each incoming product, to select the end product with an optimum normalized parameter value as the end product to be produced therefrom; and (iv) perform step (e), for each incoming product, to produce the end product selected in step (d) above.

17. A system for classifying and portioning incoming food products to be portioned into two or more types of end food products to meet specific production goals for the end food products composed of desired specific levels of production for the end food products, the system comprising:

(a) a processor;

(b) a scanner coupled to the processor for scanning incoming food products and sending the scanned information of the incoming food products to the processor; and (c) a portioner coupled to the processor for portioning incoming food products; and (d) wherein the processor is configured to perform the steps of:

(i) receiving the scanned information of the incoming food products from the scanner;

(ii) for each incoming food product, based on the received scanned information and prior to beginning portioning of each food product, calculating a parameter value for each of the two or more types of end food products that may be portioned from the incoming food product, the parameter value indicating suitability of the incoming food product for producing each type of end food product;

(iii) normalizing the calculated parameter values by performing a mathematical calculation with the calculated parameter values for each of the incoming food products for the two or more types of end food products, respectively, thereby adjusting the parameter values so as to meet the production goals for each of the end food products composed of desired specific levels of production for each of the end food products, while achieving optimum parameter values;

(iv) for each incoming food product, selecting the end food product with the best normalized parameter value as the end food product to be produced therefrom; and (v) perform continuous portioning processing by directing the portioner to portion each incoming food product to produce the end food product selected in step (d) (iv) above.

18. The system of claim 17, further comprising a downstream food product diverter coupled to the processor and configured to automatically sort the portioned end food products based on their type onto two or more lines.

19. The system of claim 18, wherein the processor is configured to perform the further steps of:

receiving feedback from results of actual downstream-sorting following the continuous portioning processing; and normalizing the calculated parameter values by applying an adjustment factor to the calculated parameter values for each of the incoming food products for the two or more types of end food products, respectively, so as to meet the production goals in light of the received feedback while achieving optimum parameter values.

20. The system of claim 19, wherein the feedback comprises information selected from a group consisting of a flow rate of actual downstream-sorting following the continuous portioning processing, a rate of change of the flow rate of actual downstream-sorting following the continuous portioning processing, a status of a buffer used in the continuous portioning processing, total end food products produced, and production trends.

* * * * *